(12) United States Patent
Nenov et al.

(10) Patent No.: US 10,291,395 B1
(45) Date of Patent: May 14, 2019

(54) SECURE STORAGE OF DATA VIA A DISTRIBUTED LEDGER SYSTEM

(71) Applicant: Fortress Cyber Security, LLC, Orlando, FL (US)

(72) Inventors: Dejan Nenov, Boise, ID (US); Roumen Kassabov, Winter Park, FL (US)

(73) Assignee: Fortress Cyber Security, LLC, Orlando, FL (US)

( * ) Notice: Subject to any disclaimer, the term of this patent is extended or adjusted under 35 U.S.C. 154(b) by 0 days.

(21) Appl. No.: 15/880,193

(22) Filed: Jan. 25, 2018

(51) Int. Cl.
*H04L 29/06* (2006.01)
*H04L 9/06* (2006.01)
*H04L 9/32* (2006.01)
*H04L 29/08* (2006.01)

(52) U.S. Cl.
CPC .......... *H04L 9/0637* (2013.01); *H04L 9/3226* (2013.01); *H04L 67/1042* (2013.01)

(58) Field of Classification Search
None
See application file for complete search history.

(56) References Cited

U.S. PATENT DOCUMENTS

| | | | |
|---|---|---|---|
| 9,934,502 B1 | 4/2018 | Grassadonia et al. | |
| 2002/0076204 A1* | 6/2002 | Nakano | G11B 20/00086 386/259 |
| 2002/0107054 A1* | 8/2002 | Fujisawa | G04G 21/04 455/573 |
| 2003/0126608 A1* | 7/2003 | Safadi | H04N 21/234309 725/89 |
| 2016/0162897 A1* | 6/2016 | Feeney | G06Q 20/4014 705/71 |
| 2016/0292672 A1* | 10/2016 | Fay | G06Q 20/363 |
| 2017/0116693 A1* | 4/2017 | Rae | G06F 21/64 |
| 2017/0220815 A1* | 8/2017 | Ansari | G06F 21/64 |
| 2017/0316497 A1 | 11/2017 | Song et al. | |
| 2018/0137507 A1* | 5/2018 | Jayachandran | G06Q 20/401 |

\* cited by examiner

*Primary Examiner* — William J. Goodchild
(74) *Attorney, Agent, or Firm* — Foley and Lardner LLP

(57) ABSTRACT

The present disclosure describes systems and methods for use of a distributed ledger system to securely store data. Encrypted data files of one or more computing devices may be distributed to processing nodes of the distributed ledger system. The data may be subsequently retrieved and decrypted by the computing device or another device. Because the distributed ledger system creates a chain of hashes of prior blocks, the data may be immune to modification or corruption, as any changes to blocks storing the encrypted data may be immediately apparent.

14 Claims, 5 Drawing Sheets

SECURE STORAGE OF DATA VIA A DISTRIBUTED LEDGER SYSTEM

BACKGROUND

To prevent corruption or loss of data, many computing systems back up said data in online, offsite storage, such as in cloud storage services. The stored data may, in some instances, be private user data, such as network activity or other personal or sensitive information. In some implementations, the computing systems may back up data from other computing systems; for example, some network devices may collect and store data from other devices within a local area network, and store the data in a remote data site.

However, the remote data site represents a single point of failure or attack surface for malicious actors and hackers: access to the remote data site may expose private or sensitive data from not just one device, but many devices.

SUMMARY

The present disclosure describes a use of a distributed ledger system to securely store data. Distributed ledger systems, sometimes referred to as block chains, are online data storage systems with cryptography-based architecture providing links between records stored in "blocks". Each block contains a hash of a previous block, providing a chain of linked blocks that are immutable: any alteration of a record changes the hash of the subsequent block, which changes the hash of the next subsequent block, etc. Accordingly, any modification of data is easily detectable.

Encrypted data files of one or more computing devices may be stored in the records, and distributed to processing nodes of the distributed ledger system. The data may be subsequently retrieved and decrypted by the computing device (or another device, such as during a restore operation after device failure). Because the distributed ledger system creates a chain of hashes of prior blocks, the data may be immune to modification or corruption, as any changes to blocks storing the encrypted data may be immediately apparent. Thus, even if storage or backup servers or nodes of the ledger system are subsequently compromised, the immutable nature of the ledger system prevents an attacker from modifying the encrypted data to deceive client devices into executing malware. Storing this sensitive data on a distributed ledger system therefore greatly reduces the attack surface hackers can exploit, anonymizes user data, and prevents rogue company employees from violating customer privacy.

BRIEF DESCRIPTION OF THE FIGURES

In the drawings, like reference numbers generally indicate identical, functionally similar, and/or structurally similar elements.

DETAILED DESCRIPTION

Figure 1A:
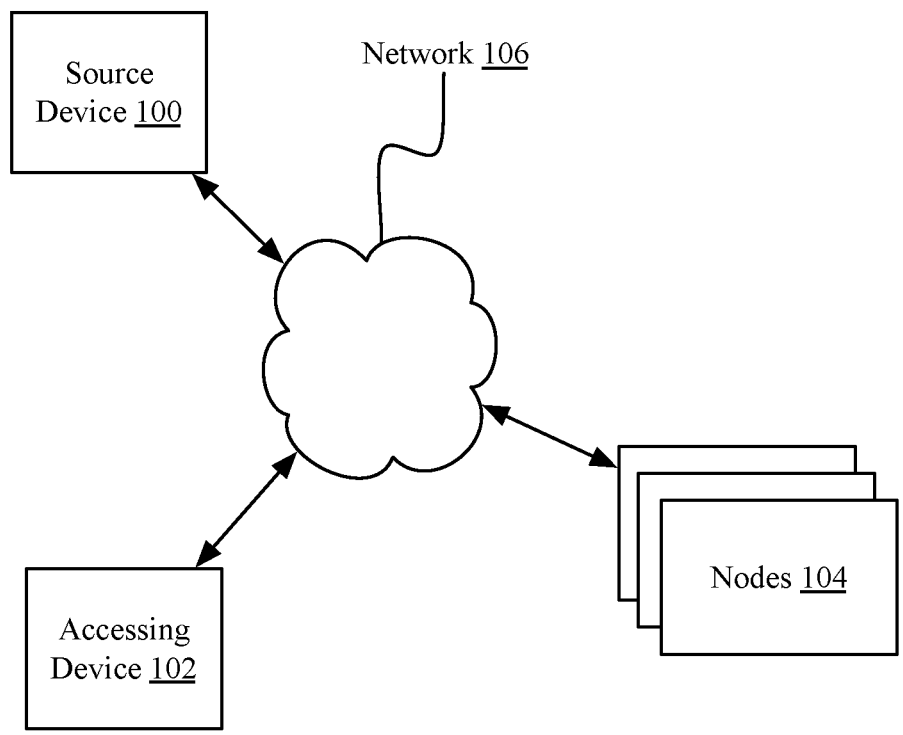
FIG. 1A is a block diagram of an embodiment of a computing environment for secure storage of data within a distributed ledger system.

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

To prevent corruption or loss of data, many computing systems back up said data in online, offsite storage, such as in cloud storage services. The stored data may, in some instances, be private user data, such as network activity or other personal or sensitive information. The data may include, without limitation, user data, system files, anti-virus libraries, configuration files, passwords or user account information, or other such data.

In some implementations, the computing systems may back up data from other computing systems; for example, some network devices may collect and store data from other devices within a local area network (LAN), and store the data in a remote data site. For example, in one such implementation, a first computing system may comprise a security device deployed on or managing a LAN and devices connected to the LAN. The security device may retrieve data from other devices on the network for backup and/or offsite storage. This data may include firmware or configuration data of other devices within the network, including network configurations of devices, filter or quality of service settings applied to devices, or any other such information.

However, the remote data site represents a single point of failure or attack surface for malicious actors and hackers: access to the remote data site may expose private or sensitive data from not just one device, but many devices. For example, if configuration data for a plurality of devices is gathered by a security device and backed up to a single remote server, access to that server may result in complete exfiltration of the data, potentially compromising network security.

Accordingly, instead in some implementations, it may be desirable to securely backup data via a distributed ledger system with no single point of failure. Distributed ledger systems, sometimes referred to as block chains, are online data storage systems with cryptography-based architecture providing links between records stored in "blocks". Each block contains a hash of a previous block, providing a chain of linked blocks that are immutable: any alteration of a record changes the hash of the subsequent block, which changes the hash of the next subsequent block, etc. Accordingly, any modification of data is easily detectable.

Encrypted data files of one or more computing devices may be stored in the records, and distributed to processing nodes of the distributed ledger system. The data may be subsequently retrieved and decrypted by the computing device (or another device, such as during a restore operation after device failure). Because the distributed ledger system creates a chain of hashes of prior blocks, the data may be immune to modification or corruption, as any changes to blocks storing the encrypted data may be immediately apparent. Thus, even if storage or backup servers or nodes of the ledger system are subsequently compromised, the immutable nature of the ledger system prevents an attacker from modifying the encrypted data to deceive client devices into executing malware. Storing this sensitive data on a distributed ledger system therefore greatly reduces the attack surface hackers can exploit, anonymizes user data, and prevents attackers from violating customer privacy or acquiring sensitive data.

Although typically discussed with records indicating transactions between users, block chains may be used to store any type of data, either in raw form or encrypted. In some implementations, block chains may include executable code that is processed by computing devices, sometimes referred to as nodes or miners, during each iteration of the block chain. This code may be sometimes referred to as a smart contract. Transactions and/or smart contracts (along with other data, parameters, etc.) may be provided to a node. The node may process the contracts and record the transactions to a ledger, along with the cryptographic hash of the previous block, and distribute the new resulting block to other nodes in the network.

Thus, in some implementations, a smart contract may maintain a data array with encrypted data and/or other data, and associated index entries corresponding to access keys to provide secure or private access to the data. For example, in some implementations, encrypted data may be stored within the array associated with an access key; the access key may be subsequently provided to the smart contract to retrieve the associated encrypted data. In some implementations, to reduce storage requirements within the block chain, data may be compressed. In other implementations, only a subset of data may be stored (e.g. configuration data). This may reduce computation requirements of the block chain (for example, various block chain systems may place a limit on processing, storage, and bandwidth per block).

The same device or other devices, sometimes referred to as client devices, may retrieve and decrypt the data stored in the distributed ledger system, either to restore data in case of loss or corruption or malicious attack; or to verify that presently stored data has not been corrupted or compromised. For example, a security device may store configuration data in the ledger system for a device, and then periodically retrieve the configuration data from the ledger system and from the device. The security device may compare the two sets of retrieved data (e.g. directly, or via a comparison of the results of a hashing algorithm applied to the data, such as MD5 or SHA256). Because the distributed ledger is immutable, if the two sets of data (or hashes) do not match, then the security device may identify the client device as potentially compromised by malicious attackers or man-in-the-middle attacks or otherwise corrupted.

For example, referring first to FIG. 1, illustrated is a computing environment comprising a source device 100, an accessing device 102 (referred to generally as client devices, clients, local or internal devices, server devices, servers, host devices, hosts, or computing devices 100, 102), and nodes 104 (sometimes referred to as full nodes, miners, pools, or by other such terms), via one or more networks 106.

Source device 100, sometimes referred to as a secure device, a trusted device (although this trust may be temporary, such as instances where the source device is subsequently compromised), security server, manufacturer device, or by other such terms, may comprise a computing device that is configured to receive or produce an initial version of data or executable code to be distributed to computing device(s) 102, to compress and/or encrypt the data, and generate a transaction or execute a smart contract to write the encrypted data or code to a ledger of a distributed ledger system (e.g. via a node 104). In many implementations, a source device 100 may be a network security device, such as a switch, router, or gateway providing security services to a home network (e.g. deployed as an intermediary between a first network 106 and a second network 106 (not illustrated) to which one or more additional computing devices (not illustrated) are connected). Source device 100 may thus provide security functions to a home network, business network, or local area network (LAN), such as a firewall, packet inspection and/or filtering, network address translation, caching, acceleration, or any other such features. In other implementations, a source device 100 may be a trusted server of a manufacturer or software or firmware provider, and may be an update server, online store, cloud data provider, or other such entity. Source device 100 may provide security through encryption and distribution of data to a ledger system, as discussed above.

Source device 100 may comprise a hardware device, such as an appliance, desktop computer, rackmount computer, laptop computer, or any other such device. In some implementations, source device 100 may comprise a virtual device executed by a physical computing device, such as a virtual appliance executed by a physical machine having a hypervisor. Source device 100 may comprise one or more devices, such as a server farm, cluster, or cloud.

As discussed above, in some implementations, source device 100 may back up data of the source device via the distributed ledger system; in other implementations, source device 100 may back up data of other devices via the ledger, such as devices on a LAN for which the source device provides security functions or management. Thus, though referred to as a "source", source device 100 may not be the initial source of the data, but may be the source providing the data to the ledger system.

In some implementations, network 106 may be provided by a source device 100, such as via a built-in network switch, WiFi access point, etc. In other implementations, one or more network management devices (not illustrated) may be connected to a source device 100 and provide network 106. For example, a network management device, such as a router, gateway, WiFi access point, or other such device, may be an intermediary between source device 100 and network 106, and may provide functionality for network 106 and communications to one or more computing devices, security sensors automation devices, and/or appliances or consumer devices. Accordingly, in some implementations, communications to networked devices from source device 100 may flow through network management devices. Source device 100 may accordingly also provide security for network management devices (e.g. protection from unauthorized access to configuration or control functions, etc.).

As discussed above, source devices 100 may receive trusted or original versions of data, including user data, configuration data, software and/or firmware updates, applications, system libraries, or any other such data, either from the source device or another computing device. The trusted or canonical version may be explicitly or manually trusted by an administrator or manufacturer of the data, or may be digitally signed (e.g. by a certificate authority) to establish a chain of trust. To provide for secure distribution of the data, the source device 100 may optionally compress the data, and/or encrypt the data. The source device 100 may generate a transaction for the ledger system or remote procedure call to be executed by a node 104 executing a smart contract to write the encrypted data into the ledger. The data may be written to the ledger along with an identifier of the data, which may comprise a private access key to be provided securely to accessing devices. In some implementations, the source device may generate a request to execute a transaction, the request comprising the identifier or access key and the data. The data and the access key may be recorded in the ledger in an array or as a parameter-value pair, and may be independently retrievable by computing devices 100, 102.

In some implementations, a source device 100 may retrieve the trusted version of the data from another source, such as a manufacturer computing device or server, and then provide the data for wider distribution, e.g. via a peer-to-peer network. This may allow for efficient distribution to accessing devices 102 and large scalability without burdening the manufacturer computing device or server, or the source device 100. While such distribution systems are normally prone to security holes and man-in-the-middle attacks, placing hashes of the data in the immutable distributed ledger for retrieval and comparison by accessing device(s) 102 mitigates or prevents such attacks. Accordingly, the resulting distribution system is highly scalable and secure.

Accessing devices 102 may comprise any type and form of computing device, including laptop computers, desktop computers, tablet computers, wearable computers, embedded computers, video game consoles, entertainment systems, "smart" appliances such as smart televisions, smart thermostats, or any other such smart appliance, home automation appliances, energy management devices (e.g. battery backup systems, generators, power conditioners, etc.), or any other such device. In some implementations, accessing devices 102 may be deployed within other devices, such as computing devices within cars (e.g. head units). Although shown separate from source device 100, in many implementations, a source device may be an accessing device (and vice versa). Accessing devices 102 may be physical devices, virtual devices executed by one or more physical devices, or a combination of physical and virtual devices. Accessing devices 102 may execute software and/or firmware, and may receive data via network 106. As discussed above, in order to retrieve data from a distributed ledger, an accessing device 102 may retrieve or receive the data using an access key provided by a source device, administrator, or user. In some implementations, the accessing device 102 may generate a transaction or remote procedure call to retrieve the hash result from the distributed ledger via the identifier, for example when a node 104 executes a smart contract to process the transaction or RPC. In other implementations, the accessing device 102 may retrieve the array or transaction corresponding to the data identifier from a node 104 via the access key, and retrieve the data placed by source device 100. In some implementations, the accessing device 102 may compare local data or a locally-generated hash of the data and the corresponding retrieved data or a hash of the data. If the values match, then the data is identical to the canonical copy, and the accessing device 102 may confirm that it has not been compromised or corrupted. If the values do not match, then the data on the local device has been modified, corrupted, or compromised. The accessing device 102 may notify an administrator or user, may discard the data, and/or may take other mitigation actions (e.g. generating a backup of user data or configurations, locking the system, identifying other device(s) that provided the data as potentially compromised, etc.).

As discussed above, nodes 104 may comprise computing devices used to generate blocks of the ledger, record transactions, execute smart contracts, and generate cryptographic hashes of other block data and/or block contents. Nodes 104 may each comprise one or more computing devices, such as desktop computing devices, rackmount computing devices, laptop computing devices, appliances, clusters, server farms, or any other type and form of computing devices. In many implementations, a large number of physical computing devices will be configured to operate together for generating blocks and processing transactions, e.g. as a pool or swarm.

Networks 106 may comprise any type and form of network, including a local area network (LAN), wide area network (WAN) such as the Internet, a wireless network, a cellular network, a satellite network, a cable network, or any combination of these or other networks. Additional devices not illustrated may be deployed on networks 106, including switches, gateways, routers, firewalls, or other such devices. Computing devices 100, 102, 104 may comprise any type and form of computing device, including desktop computers, laptop computers, tablet computers, smart phones, smart televisions, game consoles, wearable computers, networked devices or appliances such as IoT devices, server computers, workstations, or any other type and form of networked computing device, and may be variously referred to as servers, clients, hosts, remote devices, local devices, or by any other such name.

Figure 1B:
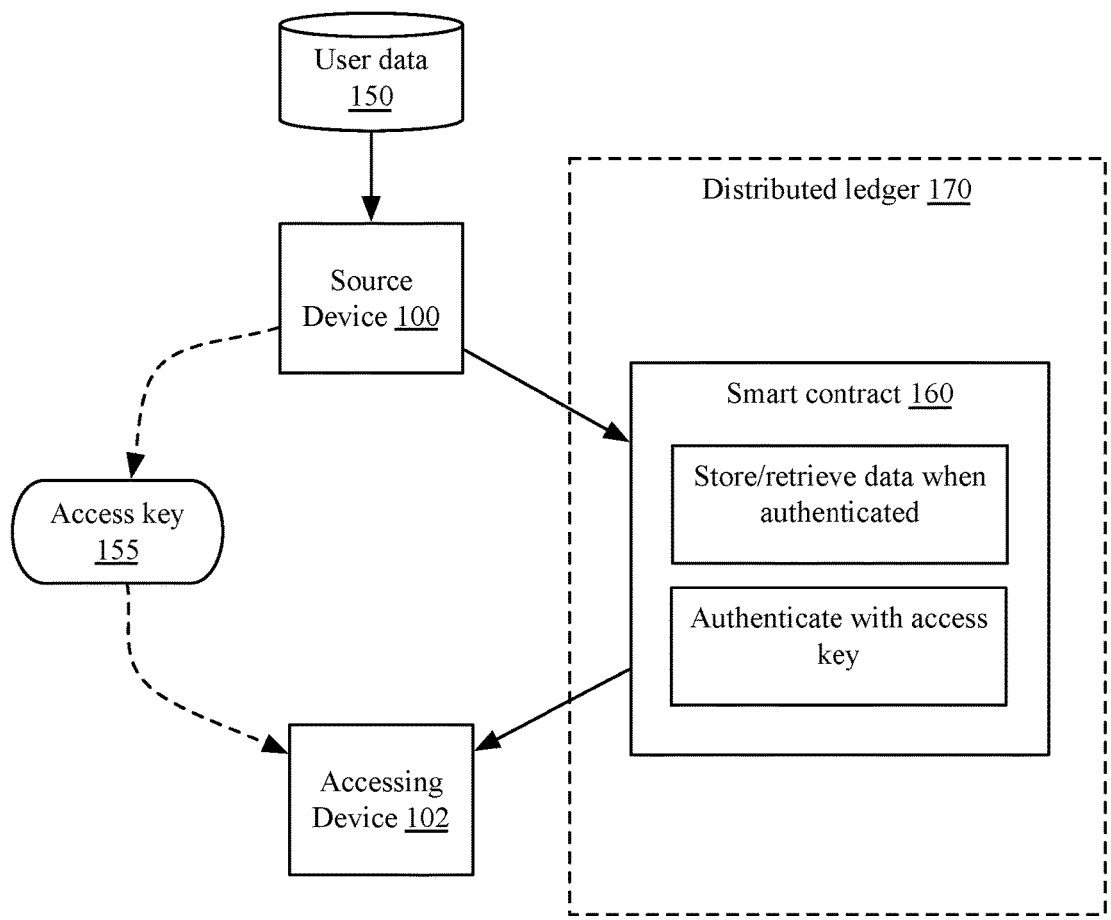
FIG. 1B is a block diagram of an embodiment of a system providing secure storage of data within a distributed ledger system.

FIG. 1B is another block diagram of a system for secure storage of data in a distributed ledger, according to some implementations. User data 150, which may comprise any type and form of data, such as configuration files, personal data, applications, system files, or any other data, may be retrieved by a source device 100 and stored, e.g. via a transaction written to a smart contract 160 of a distributed ledger 170. The data may be encrypted and stored in association with an access key 155, which may be used as an address (e.g. a wallet, an identifier, an account name, or any other similar identifiers) by the smart contract 160 for storing and retrieving the data. As shown, the access key 155 may be provided to an accessing device 102 (which may be the same as source device 100 or a different device). The accessing device 102 may authenticate with the smart contract 160 via the access key 155 (e.g. as a source address or wallet or similar identifier), and may retrieve the encrypted data in the ledger. The access key 155 may be a random number or string, or may be generated based on device identifiers, user names, public keys of key pairs used to encrypt data, etc. In one such implementation, the access key 155 may be a public key, and a private key may be similarly privately distributed or provided to accessing device 102. The accessing device 102 may retrieve the encrypted data using the public key as an address or authentication identifier, and may decrypt the data using the private key. For example, many implementations of distributed ledgers use public keys as addresses or "wallets" for account holders. The corresponding private key for decrypting data stored in association with the public address may be provided via a separate distribution means to the accessing device (e.g. offline or via a separate, secure channel).

Figure 2:
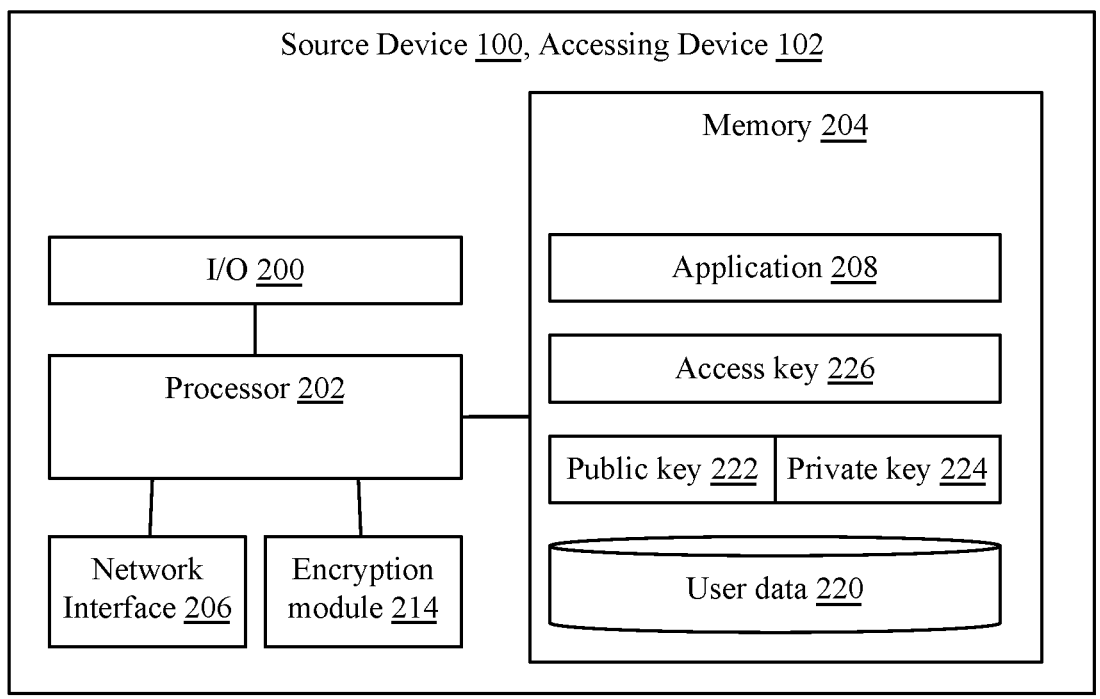
FIG. 2 is a block diagram of embodiments of source and accessing devices.

FIG. 2 is a block diagram of embodiments of servers and computing devices, such as source devices 100, accessing devices 102, and nodes 104. As discussed above, a source device 100 may comprise a laptop computer, desktop computer, wearable computer, portable computer, smart phone, tablet computer, rack mount computer, blade server, appliance, or any other type and form of device. In some implementations, a source device 100 or accessing device may not include all of elements 200-226 illustrated, or may include a plurality of any of elements 200-226 or other elements. For example, in one implementation, a source device 100 or accessing device 102 may comprise a plurality of network interfaces 206. Furthermore, although illustrated as a single device, in many implementations as discussed above, a source device 100 or accessing device 102 may comprise a plurality of devices in communication via a network, such as a separate switch and firewall, or any other combination of these or other devices. In some implementations, a source device 100 or accessing device 102 may comprise a virtual device or virtual machine, executed by a physical machine.

A source device 100 or accessing device 102 may include one or more processors 202. A processor 202 may comprise a central processing unit (CPU), microprocessor, application-specific instruction-set (ASIC) processor, or any other type and form of processor for receiving, analyzing, filtering, blocking, modifying, and/or retransmitting packets, and processing sensor signals and applying correlation rules. A processor 202 may communicate with one or more network interfaces 206, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. Network interfaces 206 may be used for receiving and transmitting packets, as well as performing many types of data extraction and processing on the packets. Network interfaces 206 may communicate with other source devices 100 or accessing devices 102 and nodes 104 via a network 106 (not illustrated), which may comprise any type and form of network or networks, including a LAN and/or WAN such as the Internet. For example, in many implementations, a source device 100 or accessing device 102 may connect to a first LAN, which may connect to the Internet, which may further connect to a second LAN connected to client devices. Accordingly, a network may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices.

Although a network interface may typically refer to computer networks or even packet-based networks, a network may also refer to serial or parallel connections to sensors, relays, motors, or other security devices. Accordingly, as shown, in many implementations network interface 206 may also refer to serial connections, GPIO connections, as well as WiFi interfaces, Bluetooth interfaces, Ethernet interfaces, power line communications interfaces, or other interfaces not illustrated. In other implementations, some or all of these features may be provided separately from network interface 206.

A network interface may include a network stack, which may comprise processing and functionality for a plurality of layers of the stack, including a physical layer, network layer, transport layer, session layer, presentation layer, application layer, or any other such layers. The network stack may comprise routines for encapsulating and de-encapsulating headers and payloads of packets at various layers, and may provide functionality for one or more protocols at any layer of the network stack.

A source device 100 or accessing device 102 may execute a packet processing engine, which may be part of the network interface 206 or network stack, or may be executed separately by a processor 202. A packet processing engine may comprise an application, service, server, daemon, routine, or other executable logic for processing packets, including performing network address translation, encryption, decryption, compression, decompression, modification of headers or payloads, buffering, caching, pooling, multiplexing, fragmentation or defragmentation, error correction, retransmission handling such as for a lossless protocol, or any other type and form of processing. In some implementations, a packet processing engine may extract data or identifiers from a packet for analysis and filtering, such as extracting IP addresses or ports, protocol types, QoS parameters, payload sizes, sequence numbers, or any other type and form of information.

A source device 100 or accessing device 102 may comprise one or more input/output interfaces 200. An input or output interface 200 may comprise any type and form of interface and/or connected peripherals, such as a video interface and display; a parallel or serial interface, such as a universal serial bus (USB) interface and a mouse or keyboard, or an external serial AT attachment (eSATA) interface and one or more external storage devices; or any other type and form of interface.

A source device 100 or accessing device 102 may comprise one or more memory devices 204. Memory 204 may comprise any type and form of memory or storage, including random access memory (RAM), hard drive storage, solid state drive storage, flash memory, optical or magneto-optical storage, tape storage, or any other type and form of storage device.

In some implementations, a source device 100 or accessing device 102 may execute an application 208. Application 208 may comprise an applet, server, daemon, service, routine, or other executable log for generating transactions, performing cryptographic hashing algorithms, and communicating with nodes of a distributed ledger. In some implementations, application 208 may provide a user interface via a display or other I/O device 200. User interfaces may provide a user or administrator with access to log information, configuration settings, and/or control (e.g. quarantine a suspect device, authorize canonical versions of data, or any other such controls). In some implementations, application 208 may comprise a web browser, and a user interface may comprise a web page maintained by a web server (not illustrated) stored in memory and executed by the source device 100 or accessing device 102. This may also allow access to user interfaces from source devices 100 or accessing devices 102 on a local network. In other implementations, application 208 may comprise a standalone application, such as a Java application. In some implementations, application 208 may control other output devices.

In some implementations, a source device 100 or accessing device 102 may have an encryption module 214. Encryption module 214, sometimes referred to as an encryption co-processor, a cryptographic accelerator, a secure crypto-processor, or a trusted platform module (TPM), may comprise hardware for efficiently performing encryption and decryption or calculation of cryptographic hash results. Encryption co-processors may be more efficient, faster, and/or use less power than general purpose processors 202 when performing encryption, as they typically have dedicated architecture for such calculations. The encryption co-processor circuitry may be an application-specific integrated circuit (ASIC) or similar circuit for performing encryption on a bit stream or data file. In other implementations, encryption module 214 may be executed by a processor 202.

Computing devices 100, 102 (as well as node(s) 104) may be identified by a device identifier (not illustrated). A device identifier may comprise an alphanumeric string, serial number, MAC address, username or account name, address, GUID, or any other type and form of identifier to distinguish a computing device from other computing devices. In many implementations, device identifier may be set by a manufacturer, while in other implementations, device identifier may be set by an administrator or user (e.g. user name).

In some implementations, a source device 100 or accessing device 102 may store data 220, which may be data of any type and form, including executable logic, applications, system libraries, configuration data, user data, or any other such data. Data may be stored encrypted or decrypted, compressed or uncompressed, and may be both compressed and encrypted prior to transmission to a ledger node (in many implementations).

To encrypt the data, an encryption module 214 may generate a public key 222 and private key 224 pair (e.g. for public key encryption). In some implementations, the encryption module 214 may also generate an access key 226. Keys 222, 224, 226 may be in any data format, and may frequently comprise elliptic curve key pairs, RSA key pairs, or any other type and form of encryption and/or decryption keys. In some implementations, public key 222 may serve as access key 226. In other implementations, access key 226 may comprise a random number or string, a user or account name or identifier, a device identifier, or any other type of data. As discussed above, in many implementations, data 220 may be encrypted via public key 222 and provided to a distributed ledger or smart contract for storage, along with either the public key 222 or an access key 226 for authentication and/or association with the data for subsequent retrieval. Private key 224 may be maintained for subsequent retrieval and decryption of the data, and/or may be provided to another device (e.g. accessing device 102).

Figure 3:
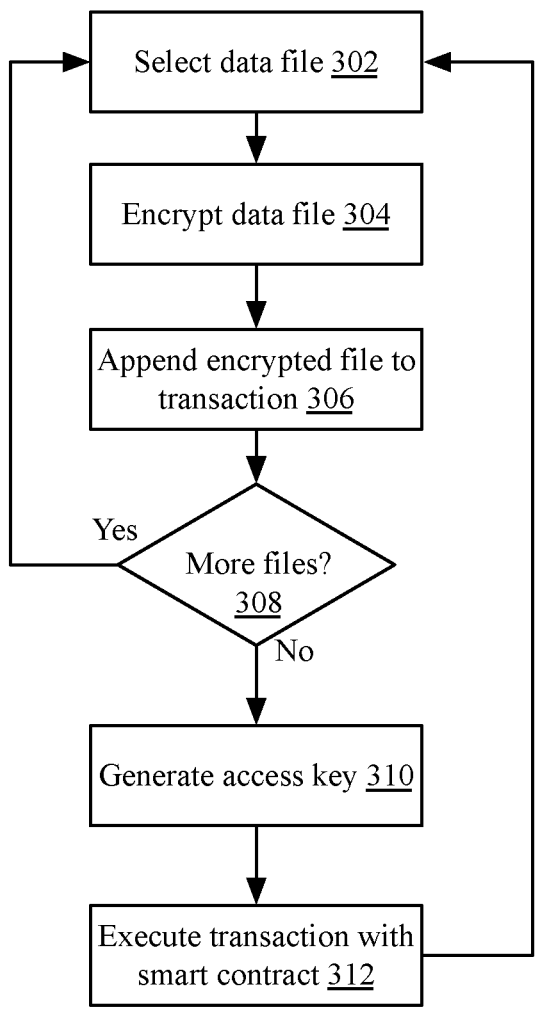
FIG. 3 is a flow chart of an embodiment of a method for secure storage of data within a distributed ledger system.

FIG. 3 is a flow chart of an embodiment of a method 300 for secure storage of data within a distributed ledger system. Portions of method 300 may be performed by one or more source devices, and/or by other devices such as accessing devices 102. For example, in some implementations, a first source device 100 may perform a first portion of method 300 (e.g. steps 302-308) while a second source device 100 may perform a second portion of method 300 (e.g. steps 310-312). For example, a first source device 100 may comprise an administrator or master device provided or maintained by a manufacturer of software or firmware, while a second source device 100 may comprise a device deployed as a gateway to a LAN. In other implementations, a single device may perform all of the steps of method 300.

At step 302, a source device may select a data file for processing and storage in the distributed ledger. The data file may be any type and form of data file. In some implementations, the data file may be selected based on how crucial the data file is to operations of the computing device. For example, the source device may select firmware, operating system libraries or configuration data, or other such data for storage. In other implementations, the data file may be selected from user files, e.g. documents or configuration files generated by or modified by a user. In some other implementations, data files may be selected based on use (e.g. recent use or modification, frequency of use or modification, etc.).

At step 304, the source device may encrypt the data file using a first key (e.g. public key of a key pair). In some implementations, the data file may be encrypted by a cryptographic coprocessor of the device. In some implementations, the device may first compress the data file prior to encrypting the data file to reduce storage and bandwidth requirements, as well as processing and transactions costs of the ledger system.

At step 306, the source device may append the encrypted file to a transaction or request for transmission to nodes of the distributed ledger for storage. In some implementations, multiple encrypted data files may be concatenated or stored together in a single transaction or request. In other implementations, each data file may be provided to the ledger in a separate request. In implementations in which multiple encrypted data files may be concatenated or grouped together, at step 308, the source device may determine if additional files should be processed for storage. If so, steps 302-308 may be repeated iteratively for each file.

At step 310, in some implementations, the source device may generate an access key. As discussed above, the access key may comprise a random string, device identifier, user account, or any other such data. In other implementations, the access key may comprise the public key used to encrypt data at step 304.

At step 312, the source device may provide the transaction or a request to execute the transaction to a node of a distributed ledger. The transaction or request may comprise the encrypted data and the public key and/or access key, as discussed above. Receipt of the request may cause the node to generate a record comprising the encrypted data at an address corresponding to the public key and/or access key; or may cause the node to provide the public key and/or access key and encrypted data as variables to a smart contract executed by the node during processing of a block.

As discussed above, the data may be retrieved by any device with the access key and/or public key by generating a similar transaction or request, in some implementations. In other implementations, the data may be retrieved by retrieving a copy of the ledger or a portion of the ledger and extracting the encrypted data based on the access key address. The data may be decrypted using the private key obtained separately.

Accordingly, the systems and methods discussed herein provide for a secure storage of encrypted data in a distributed, immutable ledger. The data cannot be modified or corrupted by malicious attackers without such changes being immediately apparent, and the distributed nature of the ledger provides redundancy and scalability.

In one aspect, the present disclosure is directed to a method for secure storage of data via distributed ledgers. The method includes encrypting, by a processor of a first device, one or more files in a storage device maintained by the first device using a first key. The method includes generating, by a processor of the first device, an access key. The method also includes transmitting, by the first device to a second device operating as a full node for a distributed immutable ledger, the encrypted one or more files and the access key. The method also includes providing, by the first device to a third device, the access key and the first key, the third device configured to retrieve the encrypted one or more files from the distributed immutable ledger via the access key, and decrypt the one or more files using the first key.

In some implementations, the method includes collecting the one or more files, by the first device from one or more additional devices. In some implementations, the one or more files comprise configuration files. In some implementations, the method includes encrypting the one or more files by an encryption coprocessor of the first device. In some implementations, the method includes generating the first key and a second key, the first key and second key used for encrypting the one or more files. In some implementations, the access key comprises a user identifier. In some implementations, the method includes transmitting the encrypted one or more files and the access key to the second device, receipt of the encrypted one or more files and the access key causing the second device to append the encrypted one or more files to the distributed immutable ledger at an address corresponding to the access key. In some implementations, the first key comprises the access key.

In another aspect, the present disclosure is directed to a system for secure storage of data via distributed ledgers. The system includes a first device, comprising an encryption module, a network interface, and a storage device comprising one or more files, a first key, and a second key. The encryption module is configured to: encrypt one or more files in a storage device maintained by the first device using a first key, and generate an access key. The network interface is configured to: transmit, to a second device operating as a full node for a distributed immutable ledger, the encrypted one or more files and the access key, and provide, to a third device, the access key and the first key, the third device configured to retrieve the encrypted one or more files from the distributed immutable ledger via the access key, and decrypt the one or more files using the first key.

In some implementations, the network interface is further configured for collecting the one or more files from one or more additional devices. In some implementations, the one or more files comprise configuration files. In some implementations, the encryption module comprises a hardware encryption coprocessor. In some implementations, the encryption module is configured to generate the first key and a second key, the first key and second key used for encrypting the one or more files. In some implementations, the access key comprises a user identifier. In some implementations, the access key comprises the first key. In some implementations, the network interface is further configured to transmit the encrypted one or more files and the access key to the second device, such that receipt of the encrypted one or more files and the access key causes the second device to append the encrypted one or more files to the distributed immutable ledger at an address corresponding to the access key.

Figure 4:
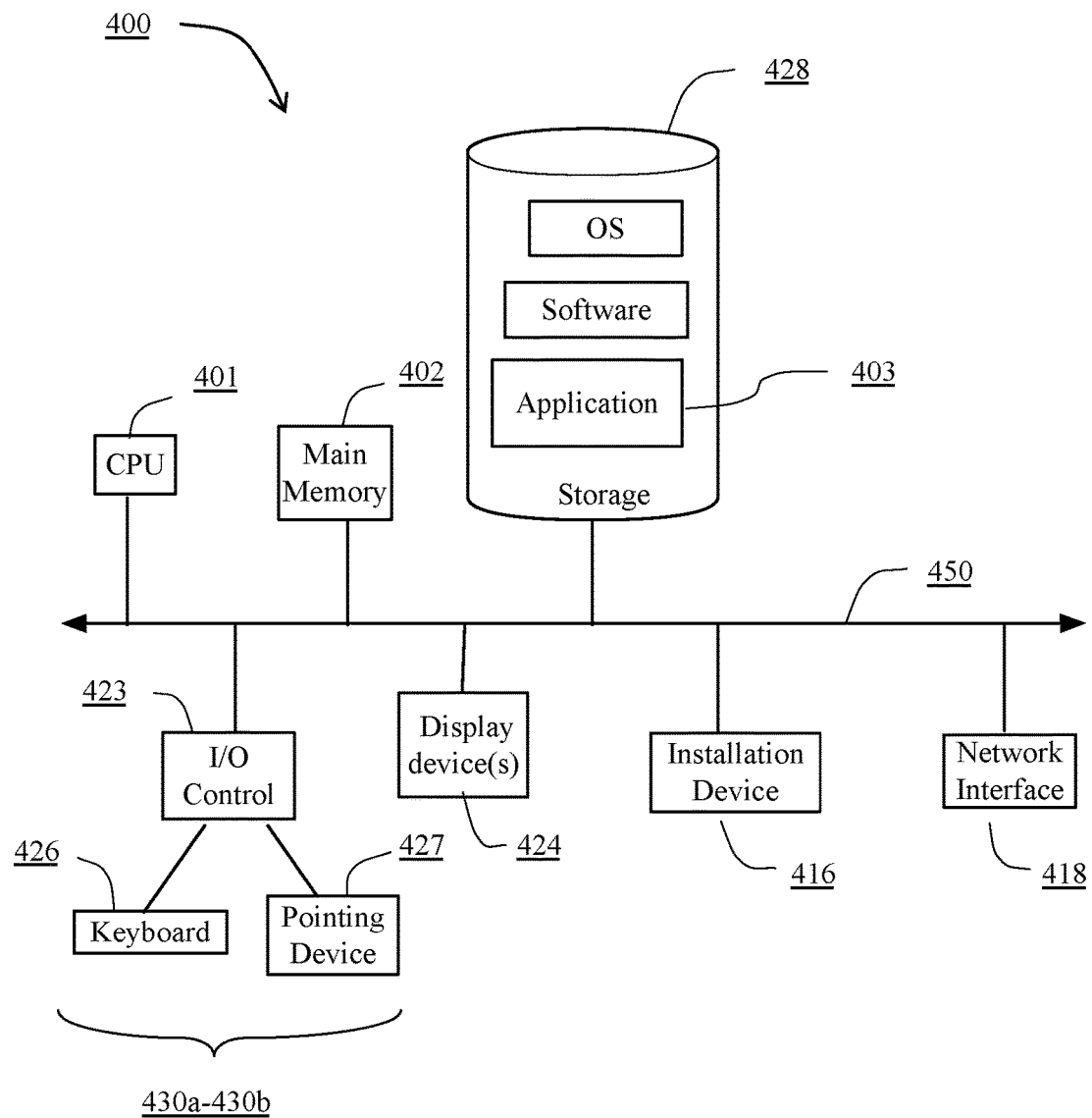
FIG. 4 is a block diagram of an exemplary computing device useful for practicing the methods and systems described herein.

FIG. 4 is a block diagram of an exemplary computing device useful for practicing the methods and systems described herein. The various devices 100, 102, and 104 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device.

FIG. 4 depicts a block diagram of a computing device 400 useful for practicing an embodiment of the security devices and/or client devices discussed above. A computing device 400 may include a central processing unit 401; a main memory unit 402; a visual display device 424; one or more input/output devices 430a-430b (generally referred to using reference numeral 430), such as a keyboard 426, which may be a virtual keyboard or a physical keyboard, and/or a pointing device 427, such as a mouse, touchpad, or capacitive or resistive single- or multi-touch input device; and a cache memory 440 in communication with the central processing unit 401.

The central processing unit 401 is any logic circuitry that responds to and processes instructions fetched from the main memory unit 402 and/or storage 428. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 402 may be one or more memory chips capable of storing data and allowing any storage location to be directly accessed by the microprocessor 401, such as random access memory (RAM) of any type. In some embodiments, main memory unit 402 may include cache memory or other types of memory.

The computing device 400 may support any suitable installation device 416, such as a floppy disk drive, a CD-ROM drive, a CD-R/RW drive, a DVD-ROM drive, tape drives of various formats, USB/Flash devices, a hard-drive or any other device suitable for installing software and programs such as a server or application 403 such as a physical security application, network security application, or combination physical and network security application, or portion thereof. The computing device 400 may further comprise a storage device 428, such as one or more hard disk drives or redundant arrays of independent disks, for storing an operating system and other related software, and for storing application software programs.

Furthermore, the computing device 400 may include a network interface 418 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 418 may comprise a built-in network adapter, network interface card, PCMCIA network card, card bus network adapter, wireless network adapter, USB network adapter, cellular modem or any other device suitable for interfacing the computing device 400 to any type of network capable of communication and performing the operations described herein.

A wide variety of I/O devices 430a-430n may be present in the computing device 400. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 430 may be controlled by an I/O controller 423 as shown in FIG. 4. The I/O controller may control one or more I/O devices such as a keyboard 426 and a pointing device 427, e.g., a mouse, optical pen, or multi-touch screen. Furthermore, an I/O device may also provide storage 428 and/or an installation medium 416 for the computing device 400. The computing device 400 may provide USB connections to receive handheld USB storage devices such as the USB Flash Drive line of devices manufactured by Twintech Industry, Inc. of Los Alamitos, Calif.

The computing device 400 may comprise or be connected to multiple display devices 424a-424n, which each may be of the same or different type and/or form. As such, any of the I/O devices 430a-430n and/or the I/O controller 423 may comprise any type and/or form of suitable hardware, software embodied on a tangible medium, or combination of hardware and software to support, enable or provide for the connection and use of multiple display devices 424a-424n by the computing device 400. For example, the computing device 400 may include any type and/or form of video adapter, video card, driver, and/or library to interface, communicate, connect or otherwise use the display devices 424a-424n. A video adapter may comprise multiple connectors to interface to multiple display devices 424a-424n. The computing device 400 may include multiple video adapters, with each video adapter connected to one or more of the display devices 424a-424n. Any portion of the operating system of the computing device 400 may be configured for using multiple displays 424a-424n. Additionally, one or more of the display devices 424a-424n may be provided by one or more other computing devices, such as computing devices 400a and 400b connected to the computing device 400, for example, via a network. These embodiments may include any type of software embodied on a tangible medium designed and constructed to use another computer's display device as a second display device 424a for the computing device 400. One ordinarily skilled in the art will recognize and appreciate the various ways and embodiments that a computing device 400 may be configured to have multiple display devices 424a-424n.

A computing device 400 of the sort depicted in FIG. 4 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 400 may have different processors, operating systems, and input devices consistent with the device. For example, in one embodiment, the computer 400 is an Apple iPhone or Motorola Droid smart phone, or an Apple iPad or Samsung Galaxy Tab tablet computer, incorporating multi-input touch screens. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, JavaScript, or in any byte code language such as JAVA or WebAssembly. The software programs may be stored on or in one or more articles of manufacture as object code.

What is claimed:

1. A method for secure storage of data via distributed ledgers, comprising:
    encrypting, by a processor of a first device, one or more files in a storage device maintained by the first device using a first key;
    generating, by a processor of the first device, an access key;
    transmitting, by the first device to a second device operating as a full node for a distributed immutable ledger, the encrypted one or more files and the access key, receipt of the encrypted one or more files and the access key causing the second device to append the encrypted one or more files to the distributed immutable ledger at an address corresponding to the access key; and
    providing, by the first device to a third device, the access key and the first key, the third device configured to:
    retrieve the encrypted one or more files from the distributed immutable ledger via the access key,
    decrypt the one or more files using the first key,
    compare the decrypted one or more files to a second one or more files stored in memory of the third device, and
    responsive to a difference between the decrypted one or more files and the second one or more files, identify the third device as compromised or corrupted.

2. The method of claim 1, further comprising collecting the one or more files, by the first device from one or more additional devices.

3. The method of claim 1, wherein the one or more files comprise configuration files.

4. The method of claim 1, wherein encrypting the one or more files further comprises encrypting, by an encryption coprocessor of the first device, the one or more files.

5. The method of claim 1, further comprising generating the first key and a second key, the first key and second key used for encrypting the one or more files.

6. The method of claim 1, wherein the access key comprises a user identifier.

7. The method of claim 1, wherein the access key comprises the first key.

8. A system for secure storage of data via distributed ledgers, comprising:
    a first device, comprising an encryption module, a network interface, and a storage device comprising one or more files, and a first key;
    wherein the encryption module is configured to:
    encrypt one or more files in a storage device maintained by the first device using the first key, and generate an access key;
wherein the network interface is configured to:
transmit, to a second device operating as a full node for a distributed immutable ledger, the encrypted one or more files and the access key, such that receipt of the encrypted one or more files and the access key causes the second device to append the encrypted one or more files to the distributed immutable ledger at an address corresponding to the access key, and
provide, to a third device, the access key and the first key, the third device configured to:
retrieve the encrypted one or more files from the distributed immutable ledger via the access key,
decrypt the one or more files using the first key,
compare the decrypted one or more files to a second one or more files stored in memory of the third device, and
responsive to a difference between the decrypted one or more files and the second one or more files, identify the third device as compromised or corrupted.

9. The system of claim 8, wherein the network interface is further configured for collecting the one or more files from one or more additional devices.

10. The system of claim 8, wherein the one or more files comprise configuration files.

11. The system of claim 8, wherein the encryption module comprises a hardware encryption coprocessor.

12. The system of claim 8, wherein the encryption module is configured to generate the first key and a second key, the first key and second key used for encrypting the one or more files.

13. The system of claim 8, wherein the access key comprises a user identifier.

14. The system of claim 8, wherein the access key comprises the first key.

* * * * *